United States Patent Office 3,147,131
Patented Sept. 1, 1964

3,147,131
METHOD FOR TREATING TITANIUM
DIOXIDE PIGMENTS
Franklin L. Kingsbury, New Brunswick, N.J., assignor to
National Lead Company, New York, N.Y., a corporation of New Jersey
No Drawing. Filed Apr. 10, 1962, Ser. No. 186,340
8 Claims. (Cl. 106—300)

This invention relates in general to the manufacture of titanium dioxide pigments. More specifically it relates to the process for improving the properties of titanium dioxide pigments particularly with respect to gloss.

Many well known methods are used for making titanium dioxide pigments in which a titanium hydrate is produced by the hydrolysis of a titanium sulfate solution followed by washing, bleaching and calcination to produce a calcined titanium dioxide pigment. This calcined material is then subjected to a wet milling treatment wherein it is finely ground and dispersed, after which it is treated with a metal hydrous oxide and subsequently dried and milled to produce a finely divided pigment material possessing high hiding power or tinting strength.

The calcined and wet milled titanium dioxide pigment may be treated with a variety of metal hydrous oxide agents. One particular method for treating the calcined titanium dioxide pigment which has been used successfully on a commercial scale is described as follows.

The calcined titanium dioxide pigment is subjected to a ball milling operation to reduce the agglomeration of the calcined materials. In this ball milling operation a dispersing agent, such as an alkali metal phosphate or silicate or other dispersants, well known to the art, is employed. The ball milled discharge is then classified to remove the coarse particles and to the fine fraction is added one or more salts of aluminum, titanium, silicon, zirconium and mixtures thereof. These salts are then converted and precipitated as hydrous oxides by the addition of reagent to form such oxides. If desirable, a flocculation agent such as $MgSO_4$ may be added to the tank prior to, or after the addition of the metal salts. The coated titanium dioxide pigment is washed to remove any soluble salts. Upon drying and milling the metal hydrous oxide coated titanium dioxide pigment has a high hiding power and good dispersion and develops a relatively high level of gloss in a paint enamel. Although titanium dioxide pigments in general have high gloss properties, it would be of great value to produce pigments having still higher gloss values.

An object of this instant invention, therefore, it to prepare titanium dioxide pigments which have higher gloss values than those previously produced. A still further object is to produce titanium dioxide pigments which possess higher gloss values by a process which is simple and economical to employ. These and other objects will become more apparent from the following more complete description of the instant inventions.

Broadly, the instant invention contemplates a treated titanium dioxide pigment having improved gloss characteristics and its method for producing the same which comprises thoroughly mixing a dry or substantially dry titanium dioxide pigment with a complex composition of perchloric acid and organo-nitrogen compound, the amount of perchloric acid employed in said composition being from 0.015% to 0.3% based on the weight of the dried pigment, said composition containing about 1 equivalent of perchloric acid for each nitrogen atom present in said organo-nitrogen compound.

Many types of nitrogen-containing compounds may be employed in the process of the instant invention. Among those which are the most successful and are readily available include the alkyl monoamines, such as mono n-propylamine, monoisopropylamine, n-butylamine, sec-butylamine, isobutylamine, tertiary butylamine, n-amylamine, isoamylamine, tertiaryamylamine, laurylamine, stearylamine, dodecylamine, octadecylamine, bis-2-hydroxyethyl soyabean amine, cyclohexylamine, dibutylamine, dipropylamine, triethylamine and the like; alkyl diamines and triamines, such as ethylenediamine, hexamethylenediamine, 1, 6 hexanediamine, diethylenetriamine, trimethylenediamine, N - cocotrimethylene-diamine, N-tallowtrimethylenediamine, N-soyatrimethylenediamine and the like; and alkyl and aryl alkanolamines, such as monoethanolamine, monopropanolamine, monobutanolamine, dimethanolamine, diethanolamine, methylethanolamine, dibutanolamine, methylisopropanolamine, diethylhexanolamine, ethylbutanolamine, triethanolamine, phenyletha- nolamine, 2-amino-2-methyl-1,3, propanediol and the like.

Other organo-nitrogen compounds which may also be used are urea and the acid amides, such as for example formamide, acetamide, acetoacetanilid, acetanilid and stearamide; quaternary ammonium hydroxide compounds, such as tetramethyl ammonium hydroxide, trimethyl ethyl ammonium hydroxide, trimethyl benzyl ammonium hydroxide, dimethyl propyl ethyl ammonium hydroxide and the like may also be used.

Other amines such as arylmonoamines and diamines may also be employed. These include aniline, benzylamine, diphenylamine, triphenylamine, toluidine, benzidine, o-phenylene diamine, p-phenylene diamine, m-phenylene diamine, 4 chloro-o-phenylene diamine and the like. Cyclic alkyl monoamines, such as piperidine and morpholine also may be included.

The process of the instant invention is simple to employ. The perchloric acid and the organo-nitrogen compounds are merely admixed in an aqueous or organic solvent and added to the substantially dry titanium dioxide pigment to obtain a uniform mixture. Acetone and alcohols are preferred to be employed as a solvent. The perchloric acid and the organo-nitrogen compound in the solvent may be added either prior to, during or after milling if desired. It is necessary that the pigment be dry or substantially dry since the complex composition tends to disperse the pigment if water is present in sufficient amounts during the admixing step. Thus dispersion of the pigments tends to take place in the presence of the treating agent when more than 10% of water is present in the titanium dioxide pigment.

It will be understood therefore that reference hereafter to a dry or substantially dry $TiO_2$ pigment is indicative of a pigment containing or having present not more than 10% water.

The amounts of perchloric acid employed should lie within the range of from 0.015% to 0.3% based on the weight of the titanium dioxide being treated. The amount of perchloric acid used in preparing the complex composition should be about 1 equivalent for each nitrogen atom present in the organo-nitrogen compound employed.

It is desirable to add to the pigment perchloric acid and the nitrogen-containing compound in amounts to produce substantially a neutral pigment (i.e. from pH of 6.0 to 8.0), after the treating agents have been added.

Since the instant invention is primarily concerned with improving the gloss properties of the titanium dioxide pigment, the following test was used to obtain the gloss data.

A standard baked enamel film of $TiO_2$ pigment (20% by volume), a binder of urea-formaldehyde (20%) and an alkyd vehicle (80%) was prepared as follows.

65 grams of the $TiO_2$ pigment were mixed with 35 grams of an alkyd vehicle. The mixture was passed through a three-roller mill. 77 grams of the paste formed was then mixed with 48.7 grams of said alkyl vehicle, 25 grams of a urea formaldehyde and 47.3 grams of xylol. This mixture was then rolled in a can for 30 minutes. After rolling the mixture was allowed to stand for 30 minutes. Glass or plastic panels were dipped into the enamel, air dried and baked for 30 minutes at 150° C. Gloss values of the baked enamel panels were determined with a 20° gloss meter.

Similar baked enamel panels were then prepared using the $TiO_2$ pigment treated according to the instant invention. The gloss values of these baked enamel films were then determined and compared with the gloss values of the standard film, the comparisons being expressed in percent increase in gloss values over the gloss value of the standard film.

In order to further illustrate the instant invention the following examples are presented:

EXAMPLE 1

A dry titanium dioxide pigment material was used in this example. A complex composition of perchloric acid and diethanolamine was used as the treating agent.

0.09 gram of perchloric acid was added to 10 ml. of acetone. With stirring 0.09 gram of diethanolamine was added dropwise into the acetone-perchloric acid mixture. These amounts of agents added are equal to 1 equivalent of perchloric acid for each nitrogen atom in the diethanolamine used.

This complex mixture was then added to 300 grams of titanium dioxide pigment and the pigment mass was thoroughly dry blended and then pulverized. The amount of treating agent added to the pigment was 0.03% expressed as perchloric acid and based on the weight of the pigment.

The treated pigment was then tested for gloss value and was compared directly with a similar titanium dioxide pigment used as a control which had not been treated. The treated pigment had a gloss value of 70 while the control pigment gloss value was 56. The result of this treated pigment shows an increase in gloss of 25% over the control.

EXAMPLE 2

The procedure of Example 1 was repeated except that 0.15% of the treating agent expressed as $HClO_4$ was used on the pigment. In this run the gloss value showed a 14% increase over the untreated pigment.

EXAMPLES 3-31

In these examples various organo-nitrogen compounds were used in place of diethanolamine to prepare the treating agent used. The various treating agents were added to portions of the pigment and the gloss values on the treated pigments were determined. The procedure used in these runs were substantially identical to that described in Example 1. The operational details and the gloss results obtained on the treated pigments are recorded along with those of Examples 1 and 2 in the following table.

Table

| Example No. | Agents used | Percent of agents used calculated as perchloric acid ($TiO_2$ wt. basis) | Percent increase in gloss |
| --- | --- | --- | --- |
| 1 | Perchloric acid plus diethanolamine | 0.03 | 25 |
| 2 | ----do---- | 0.15 | 14 |
| 3 | Perchloric acid plus triethanolamine | 0.03 | 25 |
| 4 | Perchloric acid plus benzylamine | 0.03 | 23 |
| 5 | Perchloric acid plus N-coco-trimethylene diamine | 0.15 | 16 |
| 6 | Perchloric acid plus aniline | 0.075 | 20 |
| 7 | Perchloric acid plus toluidine | 0.075 | 19 |
| 8 | Perchloric acid plus morpholine | 0.075 | 22 |
| 9 | Perchloric acid plus formamide | 0.03 | 18 |
| 10 | Perchloric acid plus 1,6-hexanediamine | 0.075 | 12 |
| 11 | Perchloric acid plus 4-chloro-o-phenylene-diamine | 0.15 | 12 |
| 12 | Perchloric acid plus m-phenylenediamine | 0.03 | 20 |
| 13 | Perchloric acid plus acetamide | 0.03 | 16 |
| 14 | Perchloric acid plus 2-amino-2-methyl-1,3, propanediol | 0.03 | 13 |
| 15 | Perchloric acid plus 1,6 hexanediamine | 0.03 | 14 |
| 16 | Perchloric acid plus benzidine | 0.03 | 18 |
| 17 | Perchloric acid plus acetoacetanilid | 0.03 | 21 |
| 18 | Perchloric acid plus diethylenetriamine | 0.03 | 27 |
| 19 | Perchloric acid plus urea | 0.03 | 27 |
| 20 | Perchloric acid plus ethylenediamine | 0.075 | 22 |
| 21 | Perchloric acid plus cyclohexylamine | 0.15 | 19 |
| 22 | Perchloric acid plus tetramethylammonium hydroxide | 0.075 | 18 |
| 23 | Perchloric acid plus bis-2-hydroxyethyl soyabean amine | 0.075 | 18 |
| 24 | Perchloric acid plus piperidine | 0.075 | 23 |
| 25 | Perchloric acid plus hexamethylenediamine | 0.075 | 28 |
| 26 | Perchloric acid plus butylamine | 0.15 | 22 |
| 27 | Perchloric acid plus monoethanolamine | 0.15 | 23 |
| 28 | Perchloric acid plus diphenylamine | 0.15 | 24 |
| 29 | Perchloric acid plus phenylethanolamine | 0.15 | 25 |
| 30 | Perchloric acid plus triethylamine | 0.15 | 9 |
| 31 | Perchloric acid plus triphenylamine | 0.15 | 33 |

From the above description of the invention and by the examples presented, it has clearly been shown that the gloss values of a titanium dioxide pigment may be improved when a dry or substantially dry pigment is treated with a small quantity of a complex composition of perchloric acid and an organo-nitrogen compound.

The treating process of the instant invention is simple and economical to employ since the complex composition of the instant invention is merely admixed with the pigment before or after milling or drying.

While this invention has been described and illustrated by the examples shown, it is not intended to be strictly limited thereto, and other variations and modifications may be employed within the scope of the following claims.

I claim:

1. Method for treating titanium dioxide pigment which comprises thoroughly mixing said pigment with a treating agent, said treating agent consisting essentially of a complex composition of perchloric acid and an organo-nitrogen compound, said organo-nitrogen compound selected from the group consisting of alkylmonoamines, alkyldiamines, alkyltriamines, alkylalkanolamines, arylalkanolamines, urea, acid amides, quaternary ammonium hydroxides, arylmonoamines, aryldiamines and cyclicalkylmonoamines, said composition containing about 1 equivalent of perchloric acid for each nitrogen atom present in said organo-nitrogen compound, said composition containing perchloric acid in amount of from 0.015% to 0.3% based on the weight of said pigment.

2. Method for treating titanium dioxide pigment containing less than 10% water which comprises thoroughly mixing said pigment with a treating agent, said treating agent consisting essentially of a complex composition of perchloric acid and an organo-nitrogen compound, said organo-nitrogen compound selected from the group consisting of alkylmonoamines, alkyldiamines, alkyltriamines, alkylalkanolamines, arylalkanolamines, urea, acid amides, quaternary ammonium hydroxides, arylmonoamines, aryldiamines and cyclicalkylmonoamines, said composition containing about 1 equivalent of perchloric acid for each nitrogen atom present in said organo-nitrogen compound, said composition containing perchloric acid in amount of from 0.015% to 0.3% based on the weight of said pigment.

3. A titanium dioxide pigment having improved gloss properties consisting essentially of a thoroughly blended mixture of said pigment and a complex composition of perchloric acid and an organo-nitrogen compound, said organo-nitrogen compound selected from the group consisting of alkylmonoamines, alkyldiamines, alkyltriamines, alkylalkanolamines, arylalkanolamines, urea, acid amides, quaternary ammonium hydroxides, arylmonoamines, aryldiamines and cyclicalkylmonoamines, said composition containing about 1 equivalent of perchloric acid for each nitrogen atom present in said organo-nitrogen compound, said composition containing perchloric acid in amount of from 0.015% to 0.3% based on the weight of said pigment.

4. Method according to claim 1 in which the organo-nitrogen compound employed is diethanolamine.

5. Method according to claim 1 in which the organo-nitrogen compound employed is diethylene triamine.

6. Method according to claim 1 in which the organo-nitrogen compound employed is urea.

7. Method according to claim 1 in which the organo-nitrogen compound employed is formamide.

8. Method according to claim 1 in which the organo-nitrogen compound employed is morpholine.

References Cited in the file of this patent
UNITED STATES PATENTS
3,015,573   Myers et al. _____ Jan. 2, 1962